Aug. 21, 1928.

R. B. KUHN 1,681,544

INTERNAL COMBUSTION ENGINE

Filed Aug. 17, 1922     2 Sheets-Sheet 1

Inventor
Robert B. Kuhn

By Frease and Bond
Attorneys

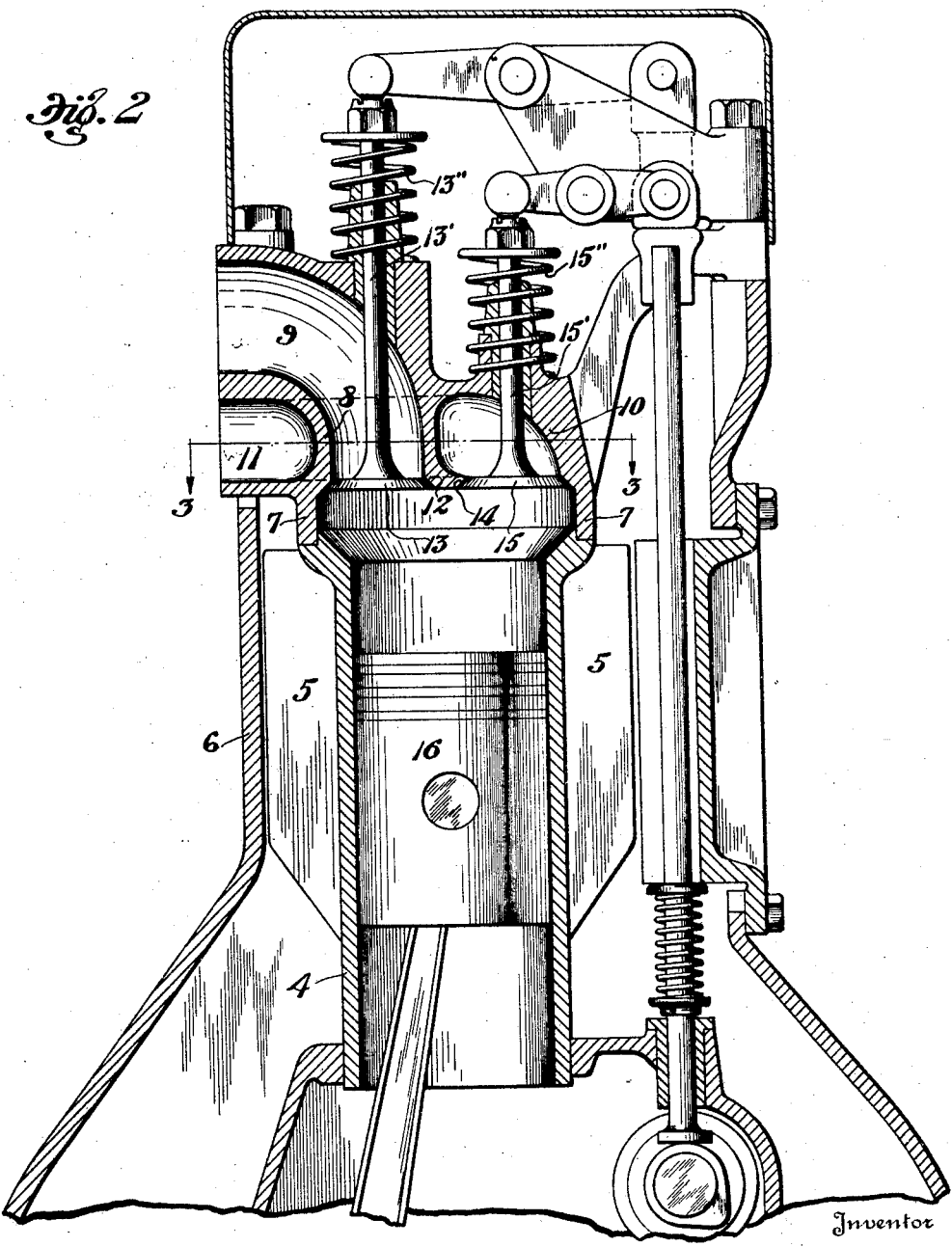

Patented Aug. 21, 1928.

1,681,544

UNITED STATES PATENT OFFICE.

ROBERT B. KUHN, OF CANTON, OHIO, ASSIGNOR TO EUNICE H. KUHN, OF CANTON, OHIO.

INTERNAL-COMBUSTION ENGINE.

Application filed August 17, 1922. Serial No. 582,472.

The invention relates to air cooled internal combustion engines and the object of the improvement is to utilize the gases flowing into the engine for cooling the heads of the cylinders and the valves therein.

This object is attained by locating the intake and exhaust valve in the head of a cylinder and by forming the cylinder head with an intake passage entirely surrounding the exhaust passage at the mouth thereof so that the incoming gases will impinge and cool the head of the cylinder and the valve seats therein.

The engine is illustrated in the accompanying drawings, forming part hereof, in which—

Figure 1:
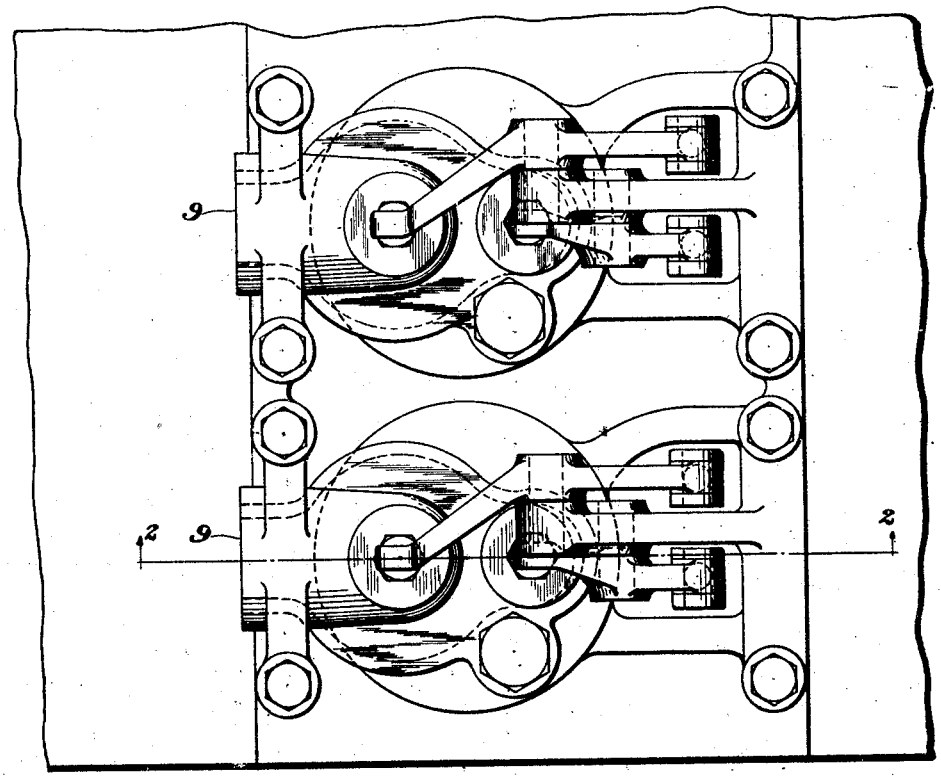
Figure 3:
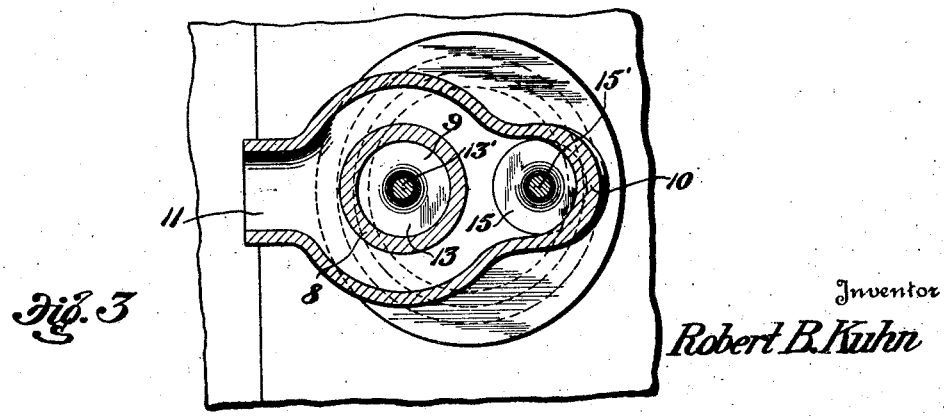

Figure 1 is a plan of two cylinders of an engine, omitting the manifolds, the cover and other parts, not pertaining to the particular improvement;

Fig. 2, an elevation cross section on line 2—2, Fig. 1, showing the cover in place; and Fig. 3, a plan section on line 3—3, Fig. 2.

Similar numerals refer to similar parts throughout the drawings.

Each engine cylinder 4 may be provided with cooling fins 5 surrounded by a jacket 6 in well known manner.

Extending upward from the cylinder head 7 is formed a tubular wall 8 forming an exhaust passage 9 and around the tubular wall 8 is formed a dome wall 10 forming an inlet passage 11 entirely surrounding the tubular wall of the exhaust passage at the mouth thereof, and the tubular exhaust passage extending through and above the dome.

In the mouth of the exhaust passage is formed a seat 12 for an exhaust valve 13 and in the mouth inlet passage is formed a seat 14 for an inlet valve 15; the valves having stems 13' and 15' controlled by springs 13" and 15" for operating in the usual manner.

The exhaust passage 9 and the inlet passage 11 communicate with respective exhaust and intake manifold, not shown, and it is evident that the comparatively cool gases drawn into the engine cylinder by operation of the piston 16 therein will impinge the tubular wall 8 of the exhaust passage adjacent to the valve seat therein, and will also flow around the same over a considerable portion of the cylinder head, thereby constantly tending to cool these parts and reduce the heat generated by the combustion of the gas in the engine cylinder.

I claim:

1. An internal combustion engine chamber having a head with a tubular extension forming an exhaust passage and a dome extension forming an inlet passage entirely surrounding the tubular exhaust passage at the mouth thereof, valves and seats therefor in the mouths of the respective passages, the inlet passage being arranged to admit gases for cooling the head of the cylinder and the valves and seats therein, said mouths being located side by side in the head, and the tubular exhaust passage extending through and above the dome.

2. An internal combustion engine chamber having a head with a tubular extension forming an exhaust passage and a dome extension forming an inlet passage surrounding the tubular exhaust passage at the mouth thereof, valves and seats therefor in the mouths of the respective passages, the inlet passage being arranged to admit gases for cooling the head of the cylinder and the valves and seats therein, said mouths being located side by side in the head, and the tubular exhaust passage extending through and above the dome.

ROBERT B. KUHN.